United States Patent
Hong et al.

(10) Patent No.: US 10,393,013 B2
(45) Date of Patent: *Aug. 27, 2019

(54) POROUS THERMAL INSULATION COATING LAYER AND PREPARING METHOD FOR THE SAME

(71) Applicant: Hyundai Motor Company, Seoul (KR)

(72) Inventors: Woong Pyo Hong, Gyeonggi-do (KR); In Woong Lyo, Gyeonggi-do (KR); Hong Kil Baek, Seoul (KR); Su Jung Noh, Seoul (KR); Seung Jeong Oh, Gyeonggi-do (KR); Seung Woo Lee, Seoul (KR); Bokyung Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 316 days.

This patent is subject to a terminal disclaimer.

(21) Appl. No.: 15/158,011

(22) Filed: May 18, 2016

(65) Prior Publication Data

US 2017/0167373 A1    Jun. 15, 2017

(30) Foreign Application Priority Data

Dec. 15, 2015 (KR) .................. 10-2015-0179494

(51) Int. Cl.
| | |
|---|---|
| *F02B 77/11* | (2006.01) |
| *C23C 4/11* | (2016.01) |
| *C23C 4/134* | (2016.01) |
| *B01J 2/02* | (2006.01) |
| *B01J 2/04* | (2006.01) |

(Continued)

(52) U.S. Cl.
CPC .............. *F02B 77/11* (2013.01); *B01J 2/02* (2013.01); *B01J 2/04* (2013.01); *C23C 4/067*
(2016.01); *C23C 4/11* (2016.01); *C23C 4/134* (2016.01); *C23C 4/18* (2013.01)

(58) Field of Classification Search
CPC .... B01J 2/02; B01J 2/04; C23C 4/067; C23C 4/11; C23C 4/134; C23C 4/18; F02B 77/11; B32B 2266/126; C08J 2205/026; C04B 14/064; F17C 2203/0325
See application file for complete search history.

(56) References Cited

U.S. PATENT DOCUMENTS

| | | | | |
|---|---|---|---|---|
| 7,859,100 | B2 * | 12/2010 | Torigoe .................. | C23C 30/00 257/703 |
| 2008/0287561 | A1 * | 11/2008 | Menashi ................ | C08J 9/0066 521/142 |

(Continued)

FOREIGN PATENT DOCUMENTS

| | | |
|---|---|---|
| DE | 10 2008 002 514 A1 | 12/2009 |
| JP | 2009209795 A * | 9/2009 |

(Continued)

OTHER PUBLICATIONS

JP-2009209795—A Machine Translation (Year: 2009).*

*Primary Examiner* — Travis M Figg
(74) *Attorney, Agent, or Firm* — Mintz Levin Cohn Ferris Glovsky and Popeo, P.C.; Peter F. Corless

(57) ABSTRACT

Disclosed are a coating layer including pores for thermal insulation and a method of preparing the same. As such, the coating layer may secure low thermal conductivity, low volume heat capacity and improved durability, such that the coating layer can be applied to an internal combustion engine.

24 Claims, 5 Drawing Sheets

(51) Int. Cl.
*C23C 4/18* (2006.01)
*C23C 4/067* (2016.01)

(56) References Cited

U.S. PATENT DOCUMENTS

| | | | | |
|---|---|---|---|---|
| 2008/0311398 | A1* | 12/2008 | Bauer | A61K 8/25 |
| | | | | 428/402 |
| 2009/0233111 | A1* | 9/2009 | Uihlein | C23C 30/00 |
| | | | | 428/469 |
| 2010/0146992 | A1* | 6/2010 | Miller | F17C 3/04 |
| | | | | 62/47.1 |
| 2012/0037838 | A1* | 2/2012 | Bauer | B01J 13/0091 |
| | | | | 252/62 |
| 2012/0082841 | A1* | 4/2012 | Kadoshima | F02B 77/11 |
| | | | | 428/312.6 |
| 2013/0255651 | A1* | 10/2013 | Nomura | F02B 23/00 |
| | | | | 123/668 |

FOREIGN PATENT DOCUMENTS

| | | | |
|---|---|---|---|
| JP | 2013-209920 | A | 10/2013 |
| JP | 2015-175285 | A | 10/2015 |
| KR | 10-1558381 | B1 | 10/2015 |
| WO | 2009/153174 | A1 | 12/2009 |

* cited by examiner

POROUS THERMAL INSULATION COATING LAYER AND PREPARING METHOD FOR THE SAME

CROSS-REFERENCE TO RELATED APPLICATION

This application claims the benefit of priority to Korean Patent Application No. 10-2015-0179494 filed in the Korean Intellectual Property Office on Dec. 15, 2015, the entire contents of which are incorporated herein by reference.

TECHNICAL FIELD OF THE INVENTION

The present invention relates to a coating layer and a method for preparing the same. In particular, the coating layer may be a porous thermal insulation coating layer that may secure low thermal conductivity, low volume heat capacity and improved durability. As such, the coating layer can be applied to an internal combustion engine of a vehicle.

BACKGROUND OF THE INVENTION

An internal combustion engine refers to an engine in which combustion gas generated by the combustion of fuel directly acts on a piston or a turbine blade and the like to convert thermal energy of the fuel into mechanical work. Although it commonly refers to a reciprocating type engine that ignites a gas mixture of fuel and air and explodes it in a cylinder to move a piston, a gas turbine, a jet engine, rocket and the like also fall within an internal combustion engine.

According to the type of fuels, the internal combustion engine may be classified into a gas engine, a gasoline engine, a petroleum engine, a diesel engine, and the like. For instance, the petroleum•gas•gasoline engines ignite into electric spark by a spark plug, and the diesel engine sprays fuel into high temperature and high pressure air to spontaneously ignite. The internal combustion engine may also be classified into 4-stroke and 2-stroke cycle types according to the stroke•movement of a piston.

Commonly, the internal combustion engine of a vehicle has been known to have thermal efficiency of about 15% to 35%, and even at the maximum efficiency of the internal combustion engine, due to thermal energy and exhaust gas discharged outside through the wall of the internal combustion engine, about 60% or greater of the total thermal energy may be wasted.

As such, if the amount of thermal energy discharged outside through the wall of an internal combustion engine is reduced, the efficiency of an internal combustion engine may increase, and thus, methods of installing thermal insulation material outside of the internal combustion engine, modifying a part of the material or structure of the internal combustion engine, or developing a cooling system of the internal combustion engine have been used.

Particularly, when discharge of heat that is generated inside the internal combustion engine outside through the wall of the internal combustion engine is minimized, the efficiency of the internal combustion engine and the fuel efficiency of an automobile may be improved. However, there have been insufficient studies on thermal insulation material or thermal insulation structure that can be maintained for a long time inside the internal combustion engine to which high temperature and high pressure conditions are repeatedly applied.

Accordingly, there is a demand for the development of novel thermal insulation material that has low thermal conductivity and excellent heat resistance, and when applied for an internal combustion engine, can be maintained for a long time.

SUMMARY OF THE INVENTION

In preferred aspects, the present invention provides a coating layer. The coating layer may comprise pores and the coating layer may be used for thermal insulation. Suitably, the coating layer of the present invention may be a porous thermal insulation coating layer unless otherwise indicated. Accordingly, in preferred aspects, the coating layer of the present invention may secure low thermal conductivity and low volume heat capacity. In addition, when the coating layer is applied to an internal combustion engine of a vehicle, the coating layer may provide improved durability.

In one aspect, the present invention provides a method for preparing a coating layer. The coating layer may comprise a binder; and a porous ceramic composite. In particular, the porous ceramic composite may comprise an aerogel and a ceramic compound, and the porous ceramic composite may comprise pores having a diameter of about 100 nm to 40,000 nm (40 µM). In addition, the porous ceramic composite may be dispersed in the binder and an average diameter of the porous ceramic composite may be of about 1 µm to 500 µm.

The term "binder", as used herein, refers to a resin or a polymeric material that may provide adhesion to components included in a matrix, or to a substrate closely located. The binder may be cured (polymerized) or partially cured upon curing process such as heating, UV radiation, electron beaming, chemical polymerization using additives and the like. Preferably, the binder of the present invention may be a ceramic-based binder that may comprise ceramic-based components, for example, metal oxides. In preferred aspects, a binder may be a ceramic-based binder.

The term "aerogel" as used herein refers to a solid or semi-solid material (e.g. gel) that contains pores. In particular, the pores in the aerogel may be filled with gas or air. Preferably, the pores of the aerogel may have various size distributions and size ranges, various shapes and various porosity or the like. The aerogel may not be particularly limited to specific materials, and preferably, the aerogel of the present invention may comprise silicon oxide, carbon or organic polymer as main components.

The term "pore" as used herein refers to a vacancy, hole or cavity formed inside a material or matrix. Size or the shape of the pore may not be particularly limited. Preferably, the pores included in the porous ceramic composite may be defined with an average diameter without particular shape of the pores.

The aerogel may comprise nanopores having a diameter of about 1 nm to 500 nm.

The term "nanopores" as used herein refers to a vacant hole, pore or cavity that may have an average diameter in nanometer scale, for example, up to 999 nm, 900 nm, 800 nm, 700 nm, 600 nm, 500 nm, or particularly of about 1 nm to 500 nm.

Preferably, a porosity of the coating layer may be of about 30% or greater.

Preferably, a volume heat capacity of the porous thermal coating layer as measured by ASTM E1269 may be of about 1500 KJ/m$^3$K or less.

Preferably, a thermal conductivity of the coating layer as measured by ASTM E1461 may be of about 2.0 W/mK or less.

Preferably, a density of the coating layer as measured by ISO 18754 may be of about 0.5 g/ml to 2.0 g/ml.

Preferably, the coating layer may have a thickness of about 10 μm to 2,000 μm.

The binder may comprise oxide of at least one metal selected from the group consisting of silicon (Si), aluminum (Al), titanium (Ti), zirconium (Zr), calcium (Ca), magnesium (Mg), yttrium (Y) and cerium (Ce).

In the porous ceramic composite, a bond may be formed between the aerogel and the ceramic compound.

The aerogel may be an aerogel powder having a diameter of about 1 μm to 5 μm.

The ceramic compound is a ceramic powder having a diameter of about 1 μm to 5 μm. Preferably, the ceramic compound may comprise oxide of at least one metal selected from the group consisting of silicon (Si), aluminum (Al), titanium (Ti), zirconium (Zr), calcium (Ca), magnesium (Mg), yttrium (Y) and cerium (Ce).

Also provided is a vehicle part that may comprise the coating layer as described herein. For example, the vehicle part may be an internal combustion engine or a component of an internal combustion engine that comprises the coating layer as described herein.

Further provided is a vehicle comprising the vehicle part comprising the coating layer as described herein.

In another aspect, the present invention provides a method of preparing a porous thermal insulation coating layer. The method may comprise: preparing porous ceramic composite particles having an average diameter of about 50 μm to 500 μm; melting a surface of the porous ceramic composite particles; and spraying the porous ceramic composite particles on a substrate. The porous ceramic composite particles may comprise an aerogel and a ceramic compound, and the aerogel may comprise pores having a diameter of about 100 nm to 40,000 nm.

When the surface of the porous ceramic composite particles is melted, the porous ceramic composite particles may be melted to a depth within about 10 μm from the surface.

Preferably, the surface of the porous ceramic composite particles may be melted by plasma that is generated by applying a current of about 300 A to 600 A to inert gas.

The spraying may be performed at a distance of about 10 mm to 200 mm from the substrate.

The porous ceramic composite particles may be prepared by steps comprising: spraying a mixture comprising the aerogel and the ceramic compound to the substrate rotating at a speed of about 1000 rpm to 20000 rpm; and heat treating a sprayed product at a temperature of about 500° C. to 1500° C.

Preferably, the solid content of the mixture may be of about 40 volume % to 60 volume % based on the total volume of the mixture.

Preferably, the content of the aerogel may be of about 50 to 500 parts by weight, based on 100 parts by weight of the ceramic compound included in the mixture.

The ceramic compound may comprise at least oxide of one metal selected from the group consisting of silicon (Si), aluminum (Al), titanium (Ti), zirconium (Zr), calcium (Ca), magnesium (Mg), yttrium (Y) and cerium (Ce).

The aerogel may comprise nanopores having a diameter of 1 nm to 500 nm.

When the porous ceramic composite particles are prepared, the heat treatment may be performed for about 1 hour to 10 hours. In addition, when the porous ceramic composite particles are prepared, the aerogel and the ceramic compound may be pulverized before spraying. Moreover, the sprayed product may be dried at a temperature of about 100° C. to 300° C., before the step of heat treatment.

Other aspects of the invention are disclosed infra.

According to the present invention, a porous thermal insulation coating layer that may secure low thermal conductivity and low volume heat capacity, and when the coating layer is applied for an internal combustion engine, it can provide improved durability.

DETAILED DESCRIPTION OF THE INVENTION

Figure 1:
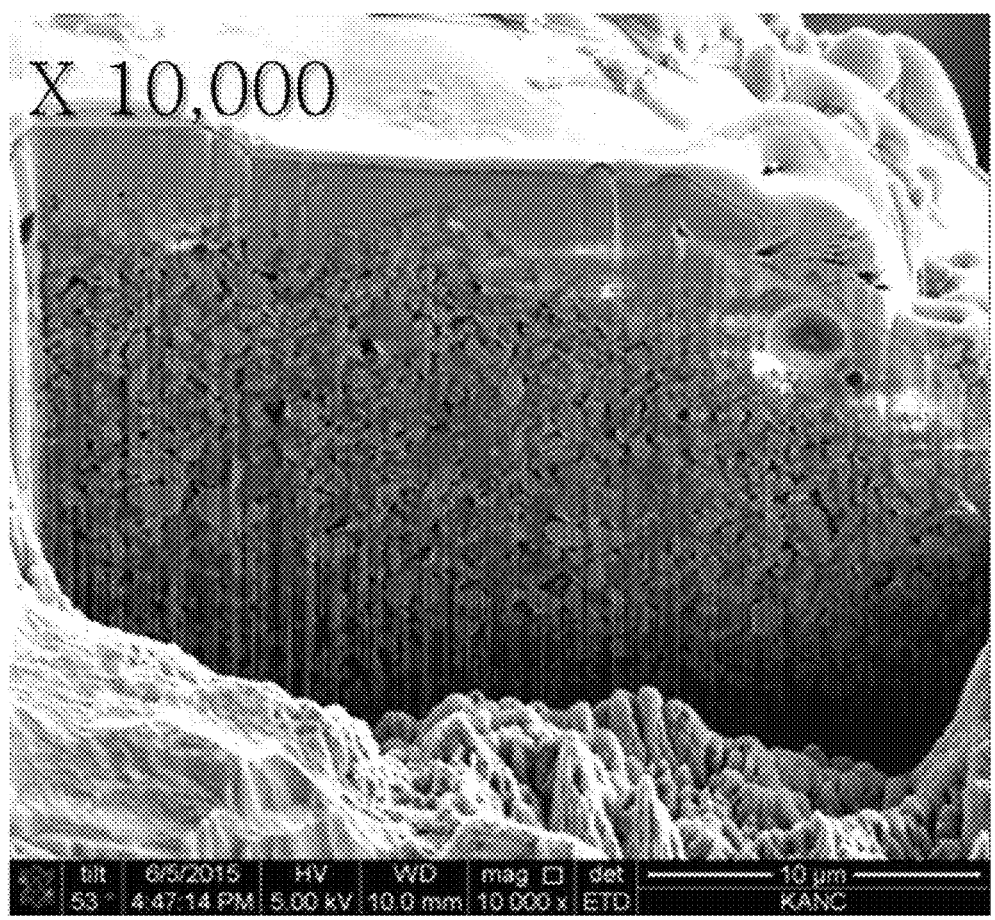
FIG. 1 shows a cross-sectional FE-SEM image of an exemplary porous thermal insulation coating layer prepared in Example according to an exemplary embodiment of the present invention.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Provided herein is a porous thermal insulation coating layer. The porous thermal insulation coating layer may comprise a binder; and a porous ceramic composite dispersed in the binder and comprising an aerogel and a ceramic compound. In particular, the porous ceramic composite may comprise pores with a diameter of about 100 nm to 40,000 nm. In addition, the porous ceramic composite may have an average diameter of 1 µm to 500 µm, Also provided herein is a method for preparing a porous thermal insulation coating layer. The method may comprise steps of: preparing porous ceramic composite particles with an average diameter of about 50 µm to 500 µm; melting the surface of the porous ceramic composite particles; and spraying the melted porous ceramic composite particles on a substrate. In particular, the prepared porous ceramic composite particles may include an aerogel and a ceramic compound, and the aerogel may include pores with a diameter of about 100 nm to 40,000 nm.

Hereinafter, a porous thermal insulation coating layer and a method for preparing the same according to various examples of the invention will be explained in detail.

According to one embodiment of the invention, provided is a porous thermal insulation coating layer comprising a ceramic-based binder; and a porous ceramic composite with an average diameter of 1 µm to 500 µm, dispersed in the binder. The porous ceramic composite may include an aerogel and a ceramic compound, and the aerogel may include pores with a diameter of about 100 nm to 40,000 nm.

The inventors have confirmed through experiments that when above-explained porous thermal insulation coating layer is used, as the exemplary porous ceramic composite of the present invention is dispersed inside the coating layer, the pore structure of the aerogel can be maintained in the thus prepared coating layer, thus providing excellent thermal insulation property. In particular, the porous ceramic composite may have an average diameter of about 1 µm to 500 µm and include the aerogel and a ceramic compound, and pores with a diameter of about 100 nm to 40,000 nm may be included in the aerogel.

In the case of the conventional method of coating a simple mixture of aerogel and a ceramic compound, aerogel may be easily exposed in the mixture when a coating process is progressed, and the exposed aerogel may be molten due to high process temperature reaching 10000K, and thus, the pore structure of the aerogel may not be maintained, thus increasing thermal conductivity and volume heat capacity.

However, by dispersing a specific porous ceramic composite in a ceramic-based binder, substantially improved coating may be obtained due to the ceramic-based binder, and simultaneously, the pores of the aerogel inside the porous ceramic composite may be maintained, thus preparing a porous thermal insulation coating layer having low thermal conductivity and volume heat capacity.

The porous thermal insulation coating layer may provide thermal insulation material or a thermal insulation structure, and the like, which may be maintained inside an internal combustion engine to which high temperature and high pressure conditions are repeatedly applied for a long time, and may be used for coating of the inner side of an internal combustion engine or the components of an internal combustion engine.

In particular, the porous thermal insulation coating layer may comprise a ceramic-based binder. The ceramic-based binder may disperse the porous ceramic composite dispersed to form the coating layer that is coated on a substrate.

The ceramic-based binder may include oxide of at least one metal selected from the group consisting of silicon (Si), aluminum (Al), titanium (Ti), zirconium (Zr), calcium (Ca), magnesium (Mg), yttrium (Y) and cerium (Ce).

In particular, the ceramic-based binder may be a ceramic melt formed by melting of porous ceramic composite particles in the method of preparing a porous thermal insulation coating layer described below, or a solidified product thereof.

The porous thermal insulation coating layer may comprise a porous ceramic composite with an average diameter of about 1 µm to 500 µm. The porous ceramic composite may be dispersed in the ceramic-based binder and comprise the aerogel and the ceramic compound. In particular, the aerogel may comprise pores having a diameter of about 100 nm to 40,000 nm. Particularly, the porous ceramic composite may be the remainder that is not molten when the porous ceramic composite particles are partly molten in the method of preparing a porous thermal insulation coating layer described below.

Particularly, it was confirmed through experiments that by using the above-described porous ceramic composite, strong bond may be formed between the aerogel and the ceramic compound in the composite, the components inside the composite may maintain a stable shape and structure even when applied to a high temperature coating process, and the like.

Particularly, the pores included in the porous ceramic composite and the nanopores included in the aerogel may maintain the structures thereof. Accordingly, when the porous ceramic composite is applied for thermal insulation material and the like, high thermal insulation effect may be obtained, and density may be reduced, which is favorable for light weight.

In addition, the porous ceramic composite has an average particle diameter of predetermined size. As such, when the porous ceramic composite is applied for a coating process, the composite may not be entirely molten, but only a portion of the surface of the composite may be molten, thus maintaining the structure of internal pores and aerogel.

On the contrary, when the conventional simple powder mixture of an aerogel and a ceramic compound, a bond between the aerogel and the ceramic compound may not be formed, thus rendering it difficult to prepare a composite having improved durability. Because the powder has an average particle diameter less than the predetermined size, for example, less than about 1 µm to 500 µm, the aerogel may be easily exposed when the subsequent coating process is progressed. Also, because the process temperature rises up to about 10000 K, the exposed aerogel may be molten, and thus, the pore structure of the aerogel may not be maintained, thus increasing thermal conductivity and volume heat capacity.

Thus, when particles having durability are formed through bonding of the aerogel inside the ceramic compound and the average particle diameter of the particles is maintained at a predetermined level, the aerogel located inside the particles may be prevented from being molten in the subsequent coating process, and the like. Accordingly, the porous thermal insulation coating layer may have low thermal conductivity and volume heat capacity.

Preferably, the porous ceramic composite may comprise an aerogel, a ceramic compound and pores with a diameter of 100 nm to 40,000 nm.

The aerogel as used herein may include tangled microfilaments with a thickness of about one in ten thousand of hair, such that the aerogel may have a porosity of about 90% or greater. The aerogel may include silicon oxide, carbon or organic polymer as main components. Particularly, the aerogel may have low density material having high light-transmittance and very low thermal conductivity due to the above explained structural properties, e.g. porosity. As the aerogel, previously known common aerogel may be used without limitation. Preferably, the aerogel including silicon oxide, carbon, polymer, metal oxide or a mixture thereof may be used. Although the examples of the polymer are not specifically limited, it may include, for example, polyvinyl alcohol, polyvinyl acetate, polyvinyl pyrrolidone, polystyrene sulfonic acid sodium salt, polyethylene oxide, polyvinylidene fluoride, polyvinylidene fluoride-hexafluoropropylene, polytetrafluoroethylene, polystyrene or polyvinylchloride and the like.

The aerogel may also include pores having a diameter of about 1 nm to 500 nm, or of about 5 nm to 300 nm, or particularly of about 10 nm to 100 nm. As such, the pores included in the aerogel may be understood or referred to as "nanopores" in the present invention. Thus the aerogel may have a specific surface area of about 100 $cm^3/g$ to 1,000 $cm^3/g$, or particularly of about 300 $cm^3/g$ to 900 $cm^3/g$.

The aerogel powder having a diameter of 1 μm to 5 μm may be used. Although the examples of the method for preparing the aerogel powder are not specifically limited, it may include, for example, a method of pulverizing aerogel of a solid state, and the method of pulverization may include various known pulverization methods such as ball mill and the like, without limitations.

The ceramic compound may include at least one or more, or two or more metal oxides. Specifically, the metal oxide may include oxides wherein one or more kind, or two or more kinds of metal atoms selected from the group consisting of silicon (Si), aluminum (Al), titanium (Ti), zirconium (Zr), calcium (Ca), magnesium (Mg), yttrium (Y) and cerium (Ce) are respectively bonded to oxygen. More specifically, the examples of the metal oxide may include yttria-stabilized zirconia (YSZ) including zirconium oxide and yttrium oxide.

The ceramic compound may be a ceramic powder having a diameter of about 1 μm to 5 μm. Examples of the method for preparing the ceramic powder are not specifically limited, and for example, may include a method of pulverizing a ceramic compound of a solid state, and the method of pulverization may include various known pulverization methods such as ball mill and the like, without limitations.

A bond may be formed between the aerogel and the ceramic compound included in the porous ceramic composite. By the bond formation between the aerogel and the ceramic compound, the components inside the composite may maintain a stable shape and structure even when applied for a high temperature coating process and the like.

The bond between the aerogel and the ceramic compound may include a physical bond or adhesion that may be formed during manufacturing processes. The examples of the method for forming a bond between the aerogel and the ceramic compound are not specifically limited, and for example, may include a sintering method comprising mixing the aerogel and the ceramic compound, heating it to the temperature around a melting point, and solidifying it.

The average diameter of the porous ceramic composite may be of about 1 μm to 500 μm, or particularly of about 5 μm to 200 μm. When the average diameter of the porous ceramic composite decreased to less than about 1 μm, the content of aerogel inside the porous ceramic composite may decrease, and thus, the porosity inside the finally prepared coating layer may decrease, and thermal conductivity and volume heat capacity may increase.

When the average diameter of the porous ceramic composite increased to greater than about 500 μm, in the coating process of the porous ceramic composite, it may be difficult to realize sufficient adhesion to a substrate.

Although the examples of the shape of the porous ceramic composite are not specifically limited, the porous ceramic composite may be spherical or almost spherical or polygonal particles.

The porosity of the porous ceramic composite may be of about 30% or greater, or of about 40% or greater, or of about 50% or greater, or particularly of about 65% or of about. The porosity of the porous ceramic composite means the ratio of all pores included in the porous ceramic composite (for example, pores inside the aerogel and pores inside the coating layer), and for specific example, for one cross section of the porous ceramic composite, it may mean the percent ratio of the area occupied by pores to the total cross sectional area.

If the porosity of the porous ceramic composite decreases to less than about 30%, in the finally prepared thermal insulation coating layer, it may be difficult to obtained sufficient thermal insulation property by the aerogel.

The thermal conductivity of the porous thermal insulation coating layer as measured by ASTM E1461 may be of about 2.0 W/mK or less, or of about 1.5 W/mK or less, or of about 0.1 W/mK to 2.0 W/mK, or of about 0.1 W/mK to 1.5 W/mK. The thermal conductivity means a degree of material's capacity for transferring heat by conduction, and in general, as thermal conductivity is lower, transfer of thermal kinetic energy is slower and thus thermal insulation property is more excellent.

When the thermal conductivity of the porous thermal insulation coating layer is greater than about 2.0 W/Mk, transfer of thermal kinetic energy may become too fast, and thus, the amount of thermal energy discharged outside of the porous thermal insulation coating layer may increase and thermal insulation property may decrease, thus decreasing energy efficiency.

The volume heat capacity of the porous thermal insulation coating layer as measured by ASTM E1269 may be of about 1500 $KJ/m^3K$ or less, or of about 1400 $KJ/m^3K$ or less, or particularly of about 1000 $KJ/m^3K$ or less. The volume heat capacity means quantity of heat needed to increase the temperature of material of unit volume by 1 degree, and specifically, it may be calculated by the following Equation 1.

$$\text{Volume heat capacity } (KJ/m^3K) = \text{Specific heat } (KJ/g \cdot K) \times \text{Density } (g/m^3) \quad \text{[Equation 1]}$$

Thus, when the volume heat capacity of the porous thermal insulation coating layer is greater than about 1,500 $KJ/m^3K$, the density of the porous thermal insulation coating layer may become large, and thermal conductivity may increase, and thus, it may be difficult to obtain aimed thermal insulation property.

The porous thermal insulation coating layer may have density measured by ISO 18754 of about 0.5 g/ml to 2.0 g/ml, or particularly of about 0.7 g/ml to 1.7 g/ml. When the density of the porous thermal insulation coating layer is less than about 0.5 g/ml, excessive pores may be generated in the porous thermal insulation coating layer, and thus, mechanical strength such as weather resistance and the like of the porous thermal insulation coating layer may be lowered. And, when the density of the porous thermal insulation coating layer is greater than about 2.0 g/ml, pores may not be sufficiently generated in the porous thermal insulation coating layer, and thus, thermal conductivity and volume heat capacity may not be reduced to an optimum levels, thus decreasing thermal insulation effect.

The porous thermal insulation coating layer may have bonding strength to metal, as measured by ASTM C 633-79, of about 40 MPa or less. The method for measuring bonding strength may include, for example, coating high strength adhesive on the thermal insulation coating layer deposited on a metal test specimen of a certain size, adhering a metal test specimen of the same size on the other size, and measuring the bonding strength of the coating layer using a tension tester.

The thickness of the porous thermal insulation coating layer may be of about 10 μm to 2,000 μm, or of about 20 μm to 500 μm, or of about 30 μm to 300 μm, or particularly of about 50 μm to 100 μm. As explained above, since thermal conductivity and volume heat capacity of the porous thermal insulation coating layer correspond to properties for unit volume, thickness change may affect these properties. Accordingly, when the thickness of the porous thermal insulation coating layer is less than about 10 μm, the density of the porous thermal insulation coating layer may not be sufficiently reduced, and thus, it may be difficult to reduce thermal conductivity to an optimum level, and the functions for prevention of inside corrosion and surface protection may be degraded. Meanwhile, when the thickness of the porous thermal insulation coating layer is greater than about 2,000 μm, cracks may be generated in the porous thermal insulation coating layer.

The surface roughness of the porous thermal insulation coating layer may be less than about 1 μm, based on center line average height (Ra). The surface roughness means the size of irregular prominence and depression with a short cycle and relatively small amplitude, generated in a processed metal surface, and as the surface roughness is smaller, surface quality is more excellent. The examples of method for measuring the surface roughness are not specifically limited, for example, center line average height (Ra) of the porous thermal insulation coating layer was measured using three-dimensional surface roughness measuring instrument of Veeco Company.

When the surface roughness of the porous thermal insulation coating layer is about 1 μm or greater, based on center line average height (Ra), low thermal conductivity and low heat capacity properties may be degraded due to increase in surface area.

Meanwhile, according to another embodiment of the invention, provided is a method for preparing a porous thermal insulation coating layer comprising the steps of: preparing porous ceramic composite particles; melting the surface of the porous ceramic composite particles; and spraying the melted porous ceramic composite particles on a substrate. In particular, the porous ceramic composite particles may have an average diameter of about 50 μm to 500 μm and may comprise aerogel and a ceramic compound. Further, the porous ceramic composite particles may include pores having a diameter of about 100 nm to 40,000 nm. By the method for preparing a porous thermal insulation coating layer according to another embodiment, the porous thermal insulation coating layer of one embodiment may be obtained.

Preferably, the method for preparing a porous thermal insulation coating layer may comprise: preparing porous ceramic composite particles having an average diameter of about 50 μm to 500 μm. Particularly, the porous ceramic composite particles may comprise an aerogel and, a ceramic compound, and may comprise pores having a diameter of about 100 nm to 40,000 nm.

It was confirmed through experiments that when the specific porous ceramic composite particles are used, a strong bond might be formed between the aerogel and the ceramic compound in the composite particles. As such, the components inside the composite particles may maintain a stable shape and structure even at a high temperature applied during the coating process and the like.

Particularly, because the pores included in the porous ceramic composite particles and the nanopores included in the aerogel maintain the structures as they are, when the porous ceramic composite particles are applied as thermal insulation material and the like, high thermal insulation effect may be obtained, and density may be reduced, which may be suitable for reducing weight.

The porous ceramic composite particles may have an average particle diameter of a predetermined level. When the porous ceramic composite particles are applied for a coating process, the composite particles may not be entirely molten, but only a portion of the surface of the composite particles may be molten, and the structure of the internal pores and aerogel may be maintained.

On the contrary, when the conventional simple powder mixture of aerogel and a ceramic compound is used, the aerogel and the ceramic compound may not form a bond therebetween, thus rendering it difficult to prepare composite particles having improved durability. In addition, due to the substantially small average particle diameter of powder, the aerogel may be easily exposed when the subsequent coating process is progressed. Further, due to the high process temperature reaching 10,000 K, the exposed aerogel may be molten, and thus, the pore structure of the aerogel may not be maintained, thus increasing thermal conductivity and volume heat capacity.

Thus, it was confirmed that as particles having durability are formed through bonding of the aerogel inside the ceramic compound, and the average particle diameter of the particles may be maintained at a certain level, the aerogel located inside the particles may be prevented from being molten in the subsequent coating process, and the like. As consequence, the thus prepared porous thermal insulation coating layer may have reduced thermal conductivity and volume heat capacity.

The porous ceramic composite particle may comprise the aerogel and the ceramic compound. In addition, the porous ceramic composite particle may include pores, as of a structural feature, having a diameter of about 100 nm to 40,000 nm.

The aerogel may comprise tangled microfilaments having a thickness of about one in ten thousand of hair, and may have porosity of 90% or greater. In addition, the aerogel may include silicon oxide, carbon or organic polymer as main components. Particularly, the aerogel may have very low density, high light-transmittance and very low thermal conductivity due to the above explained structural properties.

As the aerogel, previously known common aerogel may be used, and specifically, aerogel including silicon oxide, carbon, polymer, metal oxide or a mixture thereof may be used. Although the examples of the polymer are not specifically limited, it may include, for example, polyvinyl alcohol, polyvinyl acetate, polyvinyl pyrrolidone, polystyrene sulfonic acid sodium salt, polyethylene oxide, polyvinylidene fluoride, polyvinylidene fluoride-hexafluoropropylene, polytetrafluoroethylene, polystyrene or polyvinylchloride and the like.

The aerogel may include nanopores having a diameter of about 1 nm to 500 nm, or of about 5 nm to 300 nm, or particularly of about 10 nm to 100 nm. Thus, the aerogel may have a specific surface area of about 100 $cm^3/g$ to 1,000 $cm^3/g$, or particularly of about 300 $cm^3/g$ to 900 $cm^3/g$.

The aerogel may be an aerogel powder having a diameter of about 1 μm to 5 μm. Although the examples of the method for preparing the aerogel powder are not specifically limited, it may include, for example, a method of pulverizing aerogel of solid state, and the method of pulverization may include various known pulverization methods such as ball mill and the like, without limitations.

The ceramic compound may include at least one or more, or two or more metal oxides. Preferably, the metal oxide may include oxides wherein one or more kind, or two or more kinds of metal atoms selected from the group consisting of silicon (Si), aluminum (Al), titanium (Ti), zirconium (Zr), calcium (Ca), magnesium (Mg), yttrium (Y) and cerium (Ce) are respectively bonded to oxygen. For example, the metal oxide may include yttria-stabilized zirconia (YSZ) including zirconium oxide and yttrium oxide.

The ceramic compound may be a ceramic powder having a diameter of 1 μm to 5 μm. Examples of the method for preparing the ceramic powder are not specifically limited, and for example, may include a method of pulverizing a ceramic compound of a solid state, and the method of pulverization may include various known pulverization methods such as ball mill and the like, without limitations.

The porous ceramic composite particles may comprise an amount of about 50 to 500 parts by weight, or an amount of about 80 to 400 parts by weight, or particularly, an amount of about 100 to 300 parts by weight of aerogel, based on 100 parts by weight of the ceramic compound. When the content of the aerogel is less than the predetermined content, for example, less than about 50 parts by weight, thermal conductivity of the finally prepared porous thermal insulation coating layer may not be sufficiently reduced, and sufficient thermal insulation property may not be obtained.

When the content of aerogel is greater than the predetermined content, for example, greater than about 500 parts by weight, excessive aerogel may exist inside the porous thermal insulation coating layer, and a part of the aerogel surface may be exposed to the surface of the porous thermal insulation coating layer, thus generating unevenness on the surface of the porous thermal insulation coating layer, thereby decreasing adhesion to the inner wall of an internal combustion engine.

A bond may be formed between the aerogel and the ceramic compound included in the porous ceramic composite. By the bond between the aerogel and the ceramic compound, the components inside the composite may maintain a stable shape and structure even when applied for a high temperature coating process and the like.

The bond may include a physical bond or adhesion between the aerogel and the ceramic compound. The examples of the method for forming a bond between the aerogel and the ceramic compound are not specifically limited, and for example, may include a sintering method comprising mixing the aerogel and the ceramic compound, heating it to the temperature around the melting point, and solidifying it.

The average diameter of the porous ceramic composite particles may be of about 50 μm to 500 μm, or particularly of about 50 μm to 200 μm. When the average diameter of the porous ceramic composite particles is less than about 50 μm, the aerogel included in the porous ceramic composite particles may be molten in the high temperature during coating process of the porous ceramic composite particles, thus decreasing porosity inside the finally coating layer, and increasing thermal conductivity and volume heat capacity.

When the average diameter of the porous ceramic composite particles is greater than about 500 μm, sufficient adhesion to a substrate may not be obtained in the high temperature coating process of the porous ceramic composite particles.

Figure 3:
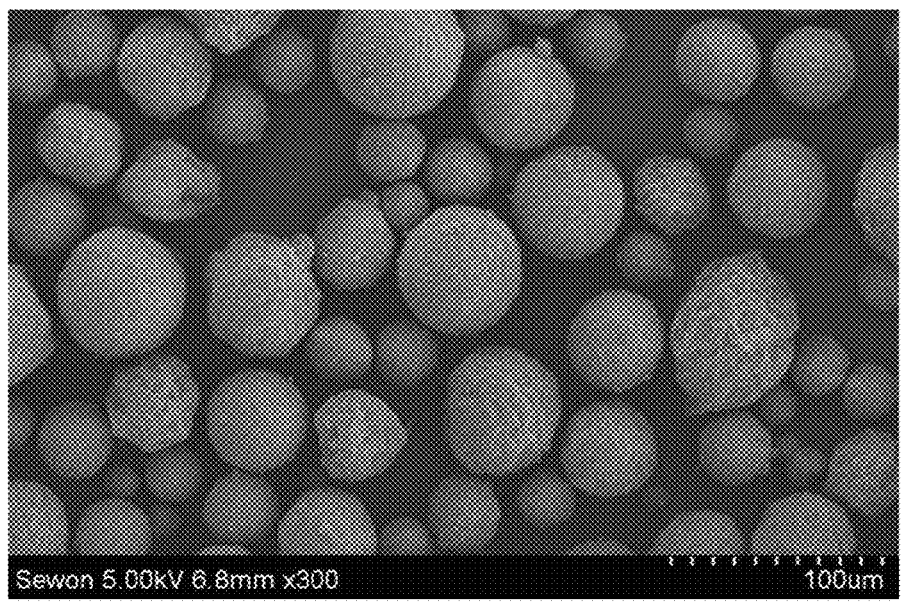
FIG. 3 shows an exterior FE-SEM image of an exemplary ceramic composite particles prepared in Example according to an exemplary embodiment of the present invention.

Although the examples of the shape of the porous ceramic composite particles are not particularly limited, as shown in FIG. 3, the porous ceramic composite particles may be particles of spherical or almost spherical or polygonal shape.

The porosity of the porous ceramic composite particles may be of about 30% or greater, or of about 40% or greater, or of about 50% or greater, or particularly of about 65% or greater. The porosity of the porous ceramic composite particles means the ratio of all pores included in the porous ceramic composite (for example, pores inside the aerogel and pores inside the coating layer), and for specific example, for one cross section of the porous ceramic composite, it may mean the percent ratio of the area occupied by pores to the total cross sectional area.

When the porosity of the porous ceramic composite decreases to less than about 30%, for example, the internal pore structure of the aerogel included in the porous ceramic composite particles may be disrupted during the coating process such that the finally prepared thermal insulation coating layer may not have sufficient thermal insulation property from the aerogel.

When the porous ceramic composite particles are prepared, a mixture comprising aerogel and a ceramic compound may be sprayed to a substrate rotating at a speed of about 1000 rpm to 20000 rpm; and the sprayed product may be heat treated at a temperature of about 500° C. to 1500° C.

The mixture may comprise aerogel and a ceramic compound, which are as explained above.

The mixture may further comprise additives such as a dispersant and the like and a solvent. Although the examples of the dispersant used as the additives are not specifically limited, for example, poly vinyl alcohol, poly vinyl chloride, polyvinyl pyrrolidone, polyethylene glycol, gelatin, starch, sodium polyacrylate, carboxymehylcellulose, hydroxyethylcelluose, sodium dodecyl sulfate, tetramethylene ammonium bromide, Aerosol-OT, dioctyl sodium sulfosuccinate, cetyltrimethyl ammonium bromide, or a mixture thereof may be mentioned.

The solvent are not specifically limited, and previously known various kinds of organic solvents, inorganic solvents, and aqueous solvents may be used without limitations.

The mixture may be prepared by adding solid contents (for example, aerogel, a ceramic compound and at least one kind of additives) to a solvent and mixing thereof, the method of mixing is not specifically limited, and various known mixing methods such as ball mill and the like may be used without limitations.

The content of solid included in the mixture may be of about 40 volume % to 60 volume %, based on the total volume of the mixture. For example, the mixture may be in the form of slurry containing solid beyond a certain level. When the solid content in the mixture is less than about 40 volume %, bubbles may be generated in the solution when the mixture is mixed, thus rendering it difficult to control the spherical shape and the size of powder mixture when drying the powder. When the solid content in the mixture is greater than about 60 volume %, viscosity of the mixture may excessively increase, and thus, microdroplet may not be formed by a spraying process.

The mixture may be sprayed on a substrate rotating at a speed of about 1000 rpm to 20000 rpm, or particularly of about 7000 rpm to 12000 rpm. In particular, by spraying the mixture on a substrate rotating at a speed of about 7000 rpm to 12000 rpm, the mixture may be flown by centrifugal force of the substrate to form droplet having a diameter of a certain level around the substrate.

When the rotating speed of the substrate is less than the predetermined speed, for example, less than about 1000 rpm, the diameter of the produced droplet may substantially increase to greater than about 200 µm, and the diameter of the finally prepared porous ceramic composite particles may also increase. Accordingly, sufficient adhesion to a substrate may not be obtained particularly in the high temperature coating process of the porous ceramic composite particles.

When the rotating speed of the substrate is greater than the predetermined speed, for example, greater than about 20000 rpm, the diameter of the produced droplet may be substantially reduced to less than about 10 µm, and the diameter of the finally prepared porous ceramic composite particles may also decrease. As consequence, the aerogel included inside the porous ceramic composite particles may be molten in the high temperature coating process of the porous ceramic composite particles, thereby decreasing porosity inside the finally prepared coating layer, and increasing thermal conductivity and volume heat capacity.

As the substrate, various rotating substrates commonly used in a method of forming droplet may be used, and the specific shape and size are not limited. The examples of the method of forming droplet may include spray drying, and for specific example, a liquid mixture is supplied to the center of a disk rotating at a high speed, and flown by the centrifugal force of the disk to form liquid droplet around the disk. For example, powderization may be performed at relatively low temperature without thermal deformation of material, and the process may be rapidly progressed to secure economical feasibility.

The method may further comprise the step of pulverizing the mixture of aerogel and a ceramic compound, before the spraying step. Accordingly, the aerogel and the ceramic compound may be mixed respectively in the form of the aerogel powder and the ceramic powder.

The aerogel powder may have a diameter of about 1 µm to 5 µm. Examples of the method for preparing the aerogel powder are not significantly limited, and for example, may include a method of pulverizing aerogel of a solid state, and as the pulverization method, various known pulverization methods such as ball mill and the like may be used without limitations.

The ceramic powder may have a diameter of about 1 µm to 5 µm. Examples of the method for preparing the ceramic powder are not significantly limited, and for example, may include a method of a ceramic compound of a solid state, and as the pulverization method, various known pulverization methods such as ball mill and the like may be used without limitations.

The method may comprise the step of heat treating the sprayed product at a temperature of about 500° C. to 1500° C., or particularly of about 700° C. to 1100° C. Accordingly, only the ceramic compound included in the sprayed product may be molten, mixed with aerogel and form a bond, and thus, durability of the finally prepared porous ceramic composite particles may be improved, and the aerogel pores inside the porous ceramic composite particles may be maintained.

When the heat treatment temperature is less than about 500° C., it may be difficult to sufficiently melt the ceramic compound, and thus, a bonding force of the ceramic compound may decrease. When the heat treatment temperature is greater than about 1500° C., the aerogel may be substantially molten, and thus, porosity inside the finally prepared porous ceramic composite particles may decrease.

The heat treatment may be progressed for about 1 hour to 10 hours, or particularly for about 2 to 5 hours.

The method may further comprise the step of drying the sprayed product at a temperature of about 100° C. to 300° C., or particularly of about 150° C. to 200° C., before the heat treatment step. Through the drying step, solvents included in the sprayed product may be removed.

The method may further comprise the step of cooling to a temperature less than about 300° C., after the heat treatment step. Through the cooling step, the porous ceramic composite particles in the form of solid powder may be obtained.

The method for preparing the porous thermal insulation coating layer may comprise the step of melting the surface of the porous ceramic composite particles before spraying them on a substrate. Accordingly, only a portion of the surface of the porous ceramic composite particles may be molten. Particularly, in the non-molten part, the pore structure of aerogel may be maintained as it is, such that a porous thermal insulation coating layer may obtain substantially improved thermal insulation property may be prepared.

When the surface of the porous ceramic composite particles is molten, it may be molten to a depth within about 10 µm from the surface. The depth within about 10 µm from the surface means about 10 µm toward the center of particles, starting from the outermost surface of the porous ceramic composite particles.

Without wishing to be bound to the theory, the porous ceramic composite particles may have an average diameter of about 50 µm to 500 µm, it may not be entirely molten, but only a surface thereof may be molten.

The melting of the surface of the porous ceramic composite particles may be performed by plasma that may be generated by applying a current of about 300 A to 600 A to inert gas. Examples of the inert gas are not significantly limited, and for example, may include at least one gas selected from the group consisting of argon, helium and hydrogen.

The plasma may be generated by applying the current of about 300 A to 600 A, or particularly of about 470 A to 500 A to inert gas. When the intensity of current is less than about 300 A, it may be difficult to generate plasma, and when the intensity of current is greater than about 600 A, excessive energy may be supplied, and thus, the aerogel inside the particles may be molten, and thermal insulation property by aerogel may not be sufficiently obtained.

The melting of the surface of the porous ceramic composite particles by plasma may be performed for less than about 1 second, or for about 0.01 to 0.5 seconds. As such, the porous ceramic composite particles may not be entirely molten, but only a portion of the surface may be molten. When the melting time is greater than the predetermined time, for example, greater than about 1 second, the porous ceramic composite particles may be substantially molten, and thus, porosity of the finally prepared porous thermal insulation coating layer may decrease.

The substrate means any material to be coated with the porous thermal insulation coating layer, and although the examples are not specifically limited, for example, it may include the inner side of an internal combustion engine, or the components of an internal combustion engine, and the like.

The spraying may be progressed at a distance of about 10 mm to 200 mm, or of about 30 mm to 180 mm, or particularly of about 50 mm to 150 mm from the substrate. When the spraying distance is less than about 10 mm, the powder may be exposed to flame for less time, and a probability of powder being molten may decrease. Thus, adhesion between powders may not be achieved, thereby decreasing coating. When the spraying distance is greater than about 200 mm, the powder may be exposed to flame for longer time, and melting of aerogel may be generated, and thus, thermal insulation property by aerogel may not be obtained.

The spraying time may be of about 5 minutes to 20 minutes. Thus, according to the method for preparing the porous thermal insulation coating layer, a coating layer with a thick thickness may be formed within a short time.

Although the examples of the spraying method are not significantly limited, for example, plasma gun may be used. For example, through a particle inlet included in the plasma gun, the particles may be supplied as plasma flame and molten, and then, sprayed toward a substrate. As the plasma gun, those with various known shapes and structures may be used without limitations.

In the method for preparing a porous thermal insulation coating layer, various examples of melting particles and spraying them on a substrate may include a thermal spray coating method. The thermal spraying means technology of melting material in the form of powder using high temperature heat source such as flame or plasma and then spraying it, and for specific apparatus, conditions and the like of the thermal spray coating, technologies commonly known in the field of coating of components may be applied without limitations.

EXAMPLE

The present invention will be explained in detail with reference to the following Examples. However, these examples are only to illustrate the invention, and the scope of the invention is not limited thereto.

Example 1: Preparation of Ceramic Composite Particles and Thermal Insulation Coating Layer (1) Preparation of Ceramic Composite Particles 1000 g of yttria-stabilized zirconia (YSZ) and 1000 g of porous silica aerogel (specific surface area about 500 cm$^3$/g) were mixed for 24 hours and ball milled to prepare a powder mixture. The powder mixture was mixed with solvent water together with a dispersant of polyvinyl alcohol (PVA). Wherein, the solid content of the mixture was about 50 volume %.

Thereafter, the mixture was sprayed to a disk rotating at a speed of about 10,000 rpm using a nozzle, to form spherical droplets. The spherical droplets was dried by applying hot air of a temperature of 180° C., and then, heat treated at a temperature of 900° C. for 4 hours to prepare ceramic composite particles with a diameter of the following Table 1.

(2) Preparation of a Thermal Insulation Coating Layer

For the ceramic composite particles, plasma thermal spray coating was conducted using arc plasma to prepare a thermal insulation coating layer. Specifically, argon and hydrogen were flowed as inert gas, and while moving a thermal spray gun, current of the following Table 1 was applied to the thermal spray gun to make the inert gas into plasma, and then, using the plasma, the ceramic composite particles were molten to a depth of about 5 μm from the surface for about 0.1 second, and sprayed at a thermal spraying distance of the following Table 1 for 10 minutes to prepare a thermal insulation coating layer with a thickness of 200 μm.

Comparative Examples 1 to 2: Preparation of Ceramic Composite Particles and Thermal Insulation Coating Layer Comparative Example 1

Ceramic composite particles and a thermal insulation coating layer were prepared by the same method as Example 1, except that the porous silica aerogel was not used.

Comparative Example 2

For the powder mixture prepared by mixing 1000 g of yttria-stabilized zirconia (YSZ) and 1000 g of porous silica aerogel (specific surface area of about 500 cm$^3$/g) for 24 hours and ball milling, plasma spray coating was conducted using arc plasma to prepare ceramic composite particles and a thermal insulation coating layer.

TABLE 1

Preparation conditions of the ceramic composite particles and thermal insulation coating layers of Examples and Comparative Examples

| | Average diameter(μm) | Thermal spraying power(A) | Thermal spraying distance(mm) |
|---|---|---|---|
| Example 1 | 100 | 470 | 75 |
| Comparative Example 1 | 100 | 470 | 75 |
| Comparative Example 2 | 20 | 470 | 75 |

As shown in the Table 1, it is confirmed that the ceramic composite particles of Example had an average diameter of 100 μm, while the ceramic composite particles of Comparative Example 2 had an average diameter of 20 μm, which was substantially reduced particle diameter as being compared to Example.

Experimental Example: Measurement of Properties of Ceramic Composite Particles and Thermal Insulation Coating Layers Obtained in Examples and Comparative Examples The properties of the ceramic composite particles and thermal insulation coating layers obtained in Example and Comparative Examples were measured as follows, and the results are shown in the following Table 2 and Table 3.

1. FE-SEM images

For the ceramic composite particles and thermal insulation coating layers obtained in Example 1 and Comparative Example 2, the internal structures were confirmed through the exterior or cross-sectional FE-SEM images, and the results are shown in the Table 2.

TABLE 2

Experimental results of Example and Comparative Examples

Figure 2:
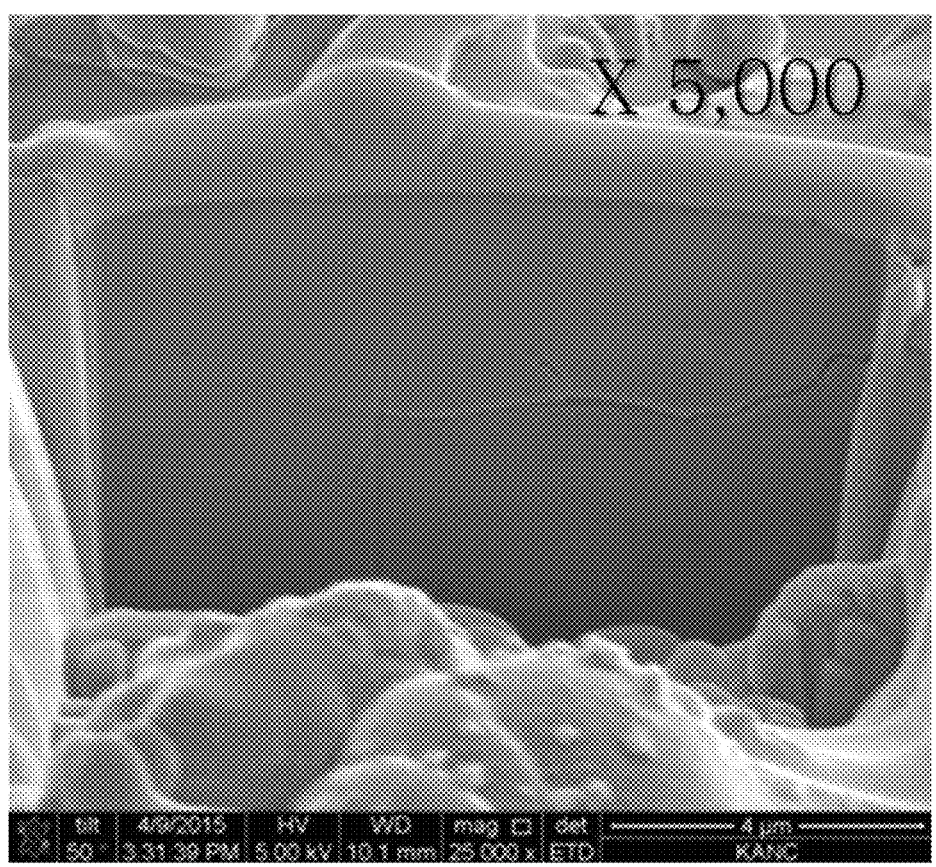
FIG. 2 shows a cross-sectional FE-SEM image of a porous thermal insulation coating layer prepared in Comparative Example 2.
Figure 4:
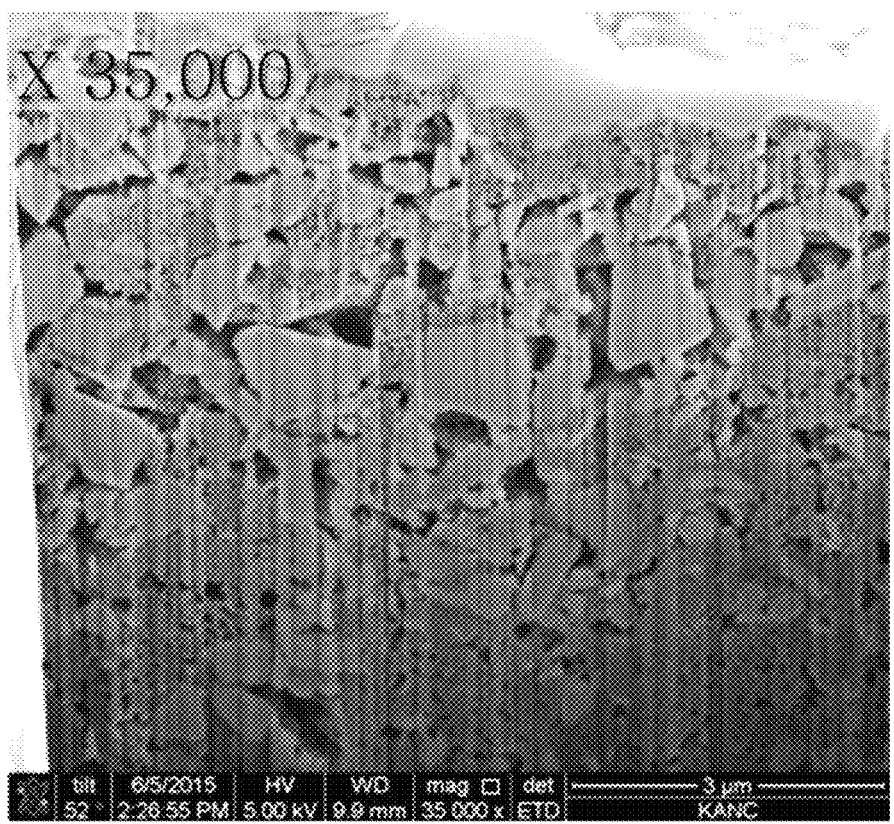
FIG. 4 shows a cross-sectional FE-SEM image of an exemplary ceramic composite particles prepared in Example according to an exemplary embodiment of the present invention.
Figure 5:
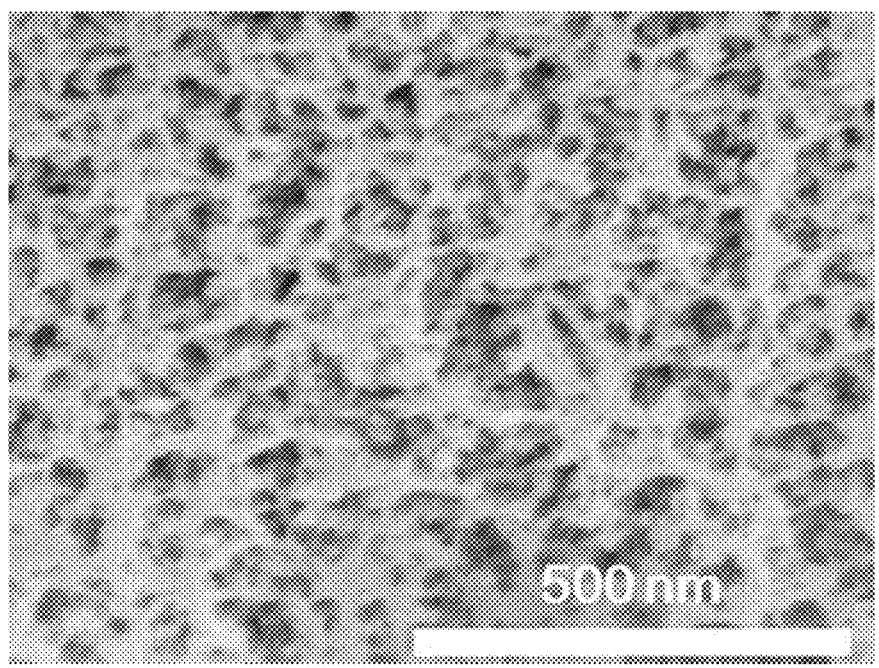
FIG. 5 shows a cross-sectional FE-SEM image of an exemplary aerogel used in Example according to an exemplary embodiment of the present invention.

| | | | FE-SEM images |
|---|---|---|---|
| Example 1 | Ceramic composite particles | Exterior | FIG. 3 |
| | | Cross section | FIG. 4 |
| | Porous thermal insulation coating layer | Cross section | FIG. 1 |
| Comparative Example 2 | Porous thermal insulation coating layer | Cross section | FIG. 2 |

As shown in FIG. 3, it was confirmed that the ceramic composite particles of Example externally had a spherical shape, and had an average diameter of 100 µm.

And, as shown in FIG. 4, it was confirmed that inside of the ceramic composite particles, yttria-stabilized zirconia (YSZ) and porous silica aerogel were uniformly mixed, and at the mixing interface, and the like, pores were additionally included to afford porosity.

In the case of the thermal insulation coating layer as shown in FIG. 1, it was confirmed that the internal structure of the ceramic composite particles was included as it is, thus exhibiting porosity, and at the external surface, a film was formed by melting of the ceramic compound or porous silica aerogel.

Meanwhile, in the case of the thermal insulation coating layer of Comparative Example 2 as shown in FIG. 2, it was confirmed that yttria-stabilized zirconia (YSZ) and porous silica aerogel are all molten, and thus, pores did not exist inside the coating layer.

2. Thermal Conductivity (W/mK)

For the thermal insulation coating layers obtained in Example and Comparative Examples, thermal conductivity was measured by thermal diffusion measurement technique using laser flash method according to ASTM E1461 under room temperature and atmospheric pressure conditions, and the results are shown in the following Table 3.

3. Volume Heat Capacity (KJ/m³K)

For the thermal insulation coating layers obtained in Example and Comparative Examples, specific heat was measured with sapphire as a reference using a DSC apparatus under room temperature condition according to ASTM E1269, thus measuring heat capacity, and the results are shown in the following Table 3.

4. Porosity (%)

For the vertical sections of the thermal insulation coating layers obtained in Example and Comparative Examples, porosity was measured using Image J program of an image analyzer, and the results are shown in the following Table 3.

5. Density (g/ml)

For the thermal insulation coating layers obtained in Example and Comparative Examples, density was measured according to ISO 18754, and the results are shown in the following Table 3.

TABLE 3

| The Experiment results of Example and Comparative Examples | | | | |
|---|---|---|---|---|
| | Thermal conductivity(W/mK) | Volume heat capacity(KJ/m³K) | Porosity(%) | Density(g/ml) |
| Example 1 | 1.0 | 600 | 80 | 0.7 |
| Comparative Example 1 | 2.2 | 2000 | 3 | 5.5 |
| Comparative Example 2 | 1.0 | 1900 | 8 | 2.4 |

As shown in the Table 3, the thermal insulation coating layer of Example secured porosity of 65% or greater, thus satisfying low volume heat capacity of 1500 KJ/m³K or less and low thermal conductivity of 2.0 or less, and the density was also low as 0.7 g/ml.

On the contrary, as Comparative Example 1 did not contain aerogel inside the ceramic composite particles, porosity rapidly decreased to 3%, and thus, volume heat capacity, thermal conductivity, and density significantly increased.

In the case of Comparative Example 2 where the powder from simple mixing a ceramic compound and aerogel was used, aerogel was molten in the process of thermal spray coating, and thus, porosity decreased to 8%, and volume heat capacity and density increased.

Thus, it was confirmed that by using porous ceramic composite particles as in Example, the pore structure of aerogel was maintained inside the porous coating layer prepared by a thermal spray coating process, thus achieving the effect of decreasing thermal conductivity and heat capacity.

What is claimed is:

1. A porous thermal insulation coating layer comprising:
   a ceramic-based binder; and
   a porous ceramic composite comprising an aerogel and a ceramic compound, and comprising pores having a diameter of about 100 nm to 40,000 nm,
   wherein the aerogel comprises nanopores having a diameter of about 1 nm to 500 nm,
   wherein a porosity of the coating layer is of about 65% or greater,
   wherein the porous ceramic composite is dispersed in the binder and an average diameter of the porous ceramic composite is of about 1 µm to 500 µm.

2. The porous thermal insulation coating layer according to claim 1,
   wherein a volume heat capacity of the coating layer as measured by ASTM E1269 is of about 1500 KJ/m³K or less.

3. The porous thermal insulation coating layer according to claim 1,
   wherein a thermal conductivity of the coating layer as measured by ASTM E1461 is of about 2.0 W/mK or less.

4. The porous thermal insulation coating layer according to claim 1,
   wherein a density of the coating layer as measured by ISO 18754 is of about 0.5 g/ml to 2.0 g/ml.

5. The porous thermal insulation coating layer according to claim 1,
   wherein the coating layer has a thickness of about 10 µm to 2,000 µm.

6. The porous thermal insulation coating layer according to claim 1,
   wherein the ceramic-based binder comprises oxide of at least one metal selected from the group consisting of silicon (Si), aluminum (Al), titanium (Ti), zirconium (Zr), calcium (Ca), magnesium (Mg), yttrium (Y) and cerium (Ce).

7. The porous thermal insulation coating layer according to claim 1,
   wherein a bond is formed between the aerogel and the ceramic compound as being included in the porous ceramic composite.

8. The porous thermal insulation coating layer according to claim 1,
   wherein the aerogel is an aerogel powder having a diameter of about 1 µm to 5 µm.

9. The porous thermal insulation coating layer according to claim 1,
   wherein the ceramic compound is a ceramic powder having a diameter of about 1 µm to 5 µm.

10. The porous thermal insulation coating layer according to claim 1,
    wherein the ceramic compound comprises oxide of at least one metal selected from the group consisting of silicon (Si), aluminum (Al), titanium (Ti), zirconium (Zr), calcium (Ca), magnesium (Mg), yttrium (Y) and cerium (Ce).

11. A vehicle part that comprises a porous thermal insulation coating layer according to claim 1.

12. The vehicle part of claim 11 is an internal combustion engine or a component of an internal combustion engine that comprises the coating layer.

13. A vehicle comprising the vehicle part of claim 11.

14. A method for preparing a porous thermal insulation coating layer, comprising:
    forming porous ceramic composite particles having an average diameter of about 50 μm to 500 μm, melting a surface of the porous ceramic composite particles; and
    spraying the porous ceramic composite particles on a substrate,
    wherein each of the porous ceramic composite particles comprise an aerogel and a ceramic compound and comprise pores having a diameter of about 100 nm to 40,000 nm,
    wherein the aerogel comprises nanopores having a diameter of about 1 nm to 500 nm,
    wherein a porosity of the coating layer is of about 65% or greater.

15. The method according to claim 14,
    wherein, when the surface of the porous ceramic composite particles is melted, the porous ceramic composite particles are melted to a depth within about 10 μm from the surface.

16. The method according to claim 14,
    wherein the surface of the porous ceramic composite particles is melted by plasma that is generated by applying a current of about 300 A to 600 A to inert gas.

17. The method according to claim 14,
    the spraying is performed at a distance of about 10 mm to 200 mm from the substrate.

18. The method according to claim 14,
    wherein the porous ceramic composite particle are prepared by steps comprising:
    spraying a mixture comprising the aerogel and the ceramic compound to a substrate rotating at a speed of about 1000 rpm to 20000 rpm; and
    heat treating a sprayed product at a temperature of about 500° C. to 1500° C.

19. The method according to claim 18,
    wherein the solid content of the mixture is of about 40 volume % to 60 volume % based on the total volume of the mixture.

20. The method according to claim 18,
    wherein the content of the aerogel is of about 50 to 500 parts by weight, based on 100 parts by weight of the ceramic compound included in the mixture.

21. The method according to claim 18,
    wherein the ceramic compound comprises at least oxide of one metal selected from the group consisting of silicon (Si), aluminum (Al), titanium (Ti), zirconium (Zr), calcium (Ca), magnesium (Mg), yttrium (Y) and cerium (Ce).

22. The method according to claim 18,
    wherein the heat treatment is performed for about 1 hour to 10 hours.

23. The method according to claim 18,
    further comprising a step of pulverizing the aerogel and the ceramic compound, before the step of spraying.

24. The method according to claim 18,
    further comprising a step of drying the sprayed product at a temperature of about 100° C. to 300° C., before the step of heat treatment.

* * * * *